United States Patent
Lu et al.

(10) Patent No.: US 10,886,789 B2
(45) Date of Patent: Jan. 5, 2021

(54) METHOD OF FOREIGN OBJECT DETECTION AND FOREIGN OBJECT DETECTION DEVICE

(71) Applicant: Automotive Research & Testing Center, Lugong (TW)

(72) Inventors: Chien-Chih Lu, Lugong (TW); Zhi-Rong Wang, Lugong (TW); Ming-Chih Lin, Lugong (TW)

(73) Assignee: Automotive Research & Testing Center, Lugong (TW)

( * ) Notice: Subject to any disclaimer, the term of this patent is extended or adjusted under 35 U.S.C. 154(b) by 202 days.

(21) Appl. No.: 16/234,454

(22) Filed: Dec. 27, 2018

(65) Prior Publication Data

US 2020/0212723 A1 Jul. 2, 2020

(51) Int. Cl.
| | | |
|---|---|---|
| *H02J 50/60* | (2016.01) | |
| *G01V 3/10* | (2006.01) | |
| *H02J 50/12* | (2016.01) | |
| *H02J 7/02* | (2016.01) | |

(52) U.S. Cl.
CPC ............. *H02J 50/60* (2016.02); *G01V 3/10* (2013.01); *H02J 50/12* (2016.02); *H02J 7/025* (2013.01)

(58) Field of Classification Search
CPC ...... H03M 1/66; H03M 1/0631; H03M 1/745; G01R 1/06766; G01V 3/10; H02J 50/60; H02J 50/12; H02J 7/025; H02J 50/402
See application file for complete search history.

(56) References Cited

U.S. PATENT DOCUMENTS

| | | | | |
|---|---|---|---|---|
| 9,304,042 | B2 * | 4/2016 | Hoffman | G01J 5/0846 |
| 9,952,266 | B2 * | 4/2018 | Katz | G01R 27/2605 |
| 10,018,744 | B2 * | 7/2018 | Roy | B60L 53/124 |
| 2011/0254503 | A1 * | 10/2011 | Widmer | B60L 3/0069 |
| | | | | 320/108 |
| 2012/0161696 | A1 * | 6/2012 | Cook | B60L 3/04 |
| | | | | 320/108 |
| 2012/0262002 | A1 * | 10/2012 | Widmer | B60L 53/122 |
| | | | | 307/104 |
| 2014/0203629 | A1 * | 7/2014 | Hoffman | B60L 53/36 |
| | | | | 307/9.1 |

(Continued)

FOREIGN PATENT DOCUMENTS

WO 2018020885 A1 2/2018

OTHER PUBLICATIONS

Search Report appended to an Office Action issued to Taiwanese counterpart application No. 107139338 by the TIPO dated May 3, 2019, with an English translation thereof.

*Primary Examiner* — Jared Fureman
*Assistant Examiner* — Michael J Warmflash

(57) ABSTRACT

A foreign object detection device includes a processor, a detecting circuit assembly connected to the processor, a coil connected to the detecting circuit assembly, a signal generator connected to the processor and the detecting circuit assembly, and a coil configuring circuit connected to the processor and the coil. The processor outputs a control signal to the coil configuring circuit so as to control the coil configuring circuit to generate a switch signal for enabling the coil to switch to one of a closed mode and an open mode, and controls the signal generator to transmit a test signal to the coil via the detecting circuit assembly when the coil is in the open mode.

15 Claims, 11 Drawing Sheets

(56) References Cited

U.S. PATENT DOCUMENTS

| | | | |
|---|---|---|---|
| 2014/0333256 A1* | 11/2014 | Widmer | B60L 53/30 |
| | | | 320/108 |
| 2018/0198323 A1* | 7/2018 | Widmer | B60L 53/124 |
| 2018/0342907 A1* | 11/2018 | Dimke | B60L 53/38 |
| 2019/0148983 A1* | 5/2019 | Kozakai | H02J 7/00 |
| | | | 320/108 |
| 2019/0337393 A1* | 11/2019 | Von Novak, III | B60S 3/04 |

* cited by examiner

METHOD OF FOREIGN OBJECT DETECTION AND FOREIGN OBJECT DETECTION DEVICE

FIELD

The disclosure relates to a method of foreign object detection (FOD) and an FOD device, and more particularly to a method of FOD for a wireless power transfer system and an FOD device adapted to be utilized in a wireless power transfer system.

BACKGROUND

Detection of metallic foreign objects and detection of living foreign objects in a conventional foreign object detection (FOD) device, which is utilized in a wireless power transfer system, are often independently implemented with techniques utilized for the independent implementations possibly being distinct from each other. For example, for one FOD device, a radar technique may be utilized to implement detection of living foreign objects, and a technique of electromagnetic induction with a coil may be utilized to implement detection of metallic foreign objects. However, utilizing distinct techniques may require separate hardware (e.g., separate electric circuits), thereby increasing manufacturing cost. Moreover, complexity of the overall system is increased as well, which may adversely affect operation efficiency or performance of the system.

SUMMARY

Therefore, an object of the disclosure is to provide a method of foreign object detection for a wireless power transfer system and an FOD device adapted to be utilized by the wireless power transfer system that can alleviate at least one of the drawbacks of the prior art.

According to one aspect of the disclosure, the method is to be implemented by an FOD device. The FOD device includes a processor, a detecting circuit assembly that is electrically connected to the processor, and a coil that is electrically connected to the detecting circuit assembly and that is controllable to switch between a closed mode and an open mode. The method includes:

(a) by the processor, triggering output of a switch signal for enabling the coil to switch to the closed mode, where the coil and the detecting circuit assembly form a closed circuit, and receiving, from the detecting circuit assembly, a voltage sensing signal that is associated with measurement of an effective value of voltage of the coil;

(b) by the processor based on the voltage sensing signal, determining whether the effective value of the voltage of the coil is outside of a predetermined first voltage range;

(c) by the processor, when it is determined that the effective value of the voltage of the coil is outside of the predetermined first voltage range, recording in metallic indication information that a metallic foreign object is detected;

(d) by the processor, triggering output of the switch signal to enable the coil to switch to the open mode, where the coil and the detecting circuit assembly form an open circuit, controlling transmission of a test signal to the coil, and receiving from the detecting circuit assembly, a frequency sensing signal that is associated with measurement of resonant frequency at which the coil and the detecting circuit assembly resonate in response to the test signal;

(e) by the processor based on the frequency sensing signal, determining whether the resonant frequency is outside of a predetermined first frequency range; and (f) by the processor when it is determined that the resonant frequency is outside of the predetermined first frequency range, recording in living indication information that a living foreign object is detected.

According to another aspect of the disclosure, the FOD device includes a processor, a detecting circuit assembly electrically connected to the processor, a coil electrically connected to the detecting circuit assembly and controllable to switch between a closed mode, where the coil and the detecting circuit assembly form a closed circuit, and an open mode, where the coil and the detecting circuit assembly form an open circuit, a signal generator electrically connected to the processor and the detecting circuit assembly, and a coil configuring circuit electrically connected to the processor and the coil, and configured to control the coil to switch to one of the closed mode and the open mode. The processor is configured to output a control signal to the coil configuring circuit so as to control the coil configuring circuit to generate a switch signal for enabling the coil to switch to one of the closed mode and the open mode, and to control the signal generator to transmit a test signal to the coil via the detecting circuit assembly when the coil is controlled to switch to the open mode.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
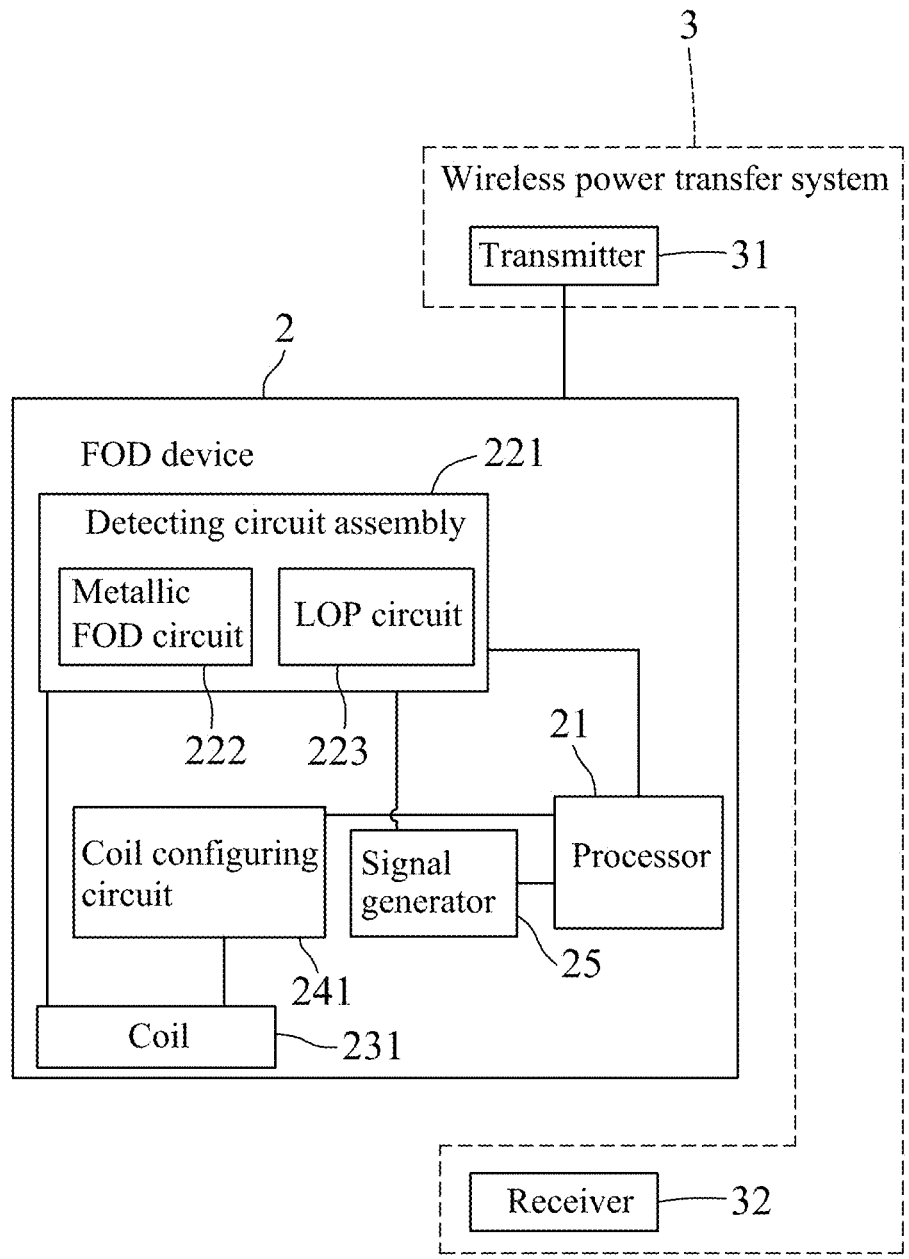
FIG. 1 is a block diagram illustrating a first embodiment of a foreign object detection (FOD) device according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIG. 1, a first embodiment of a foreign object detection (FOD) device 2 is illustrated. The FOD device 2 is adapted to be utilized by a wireless power transfer system 3. The wireless power transfer system 3 includes a transmitter 31 and a receiver 32. The transmitter 31 of the wireless power transfer system 3 is configured to wirelessly transmit power to the receiver 32 of the wireless power transfer system 3. The FOD device 2 is disposed between the transmitter 31 and the receiver 32, and is to be connected to one of the transmitter 31 and the receiver 32. In this embodiment, the transmitter 31 of the wireless power transfer system 3 is implemented to be a wireless charging station for electric vehicles, but implementation of the wireless power transfer system 3 is not limited to the disclosure herein and may vary in other embodiments.

The FOD device 2 includes a processor 21, a detecting circuit assembly 221 electrically connected to the processor 21, a coil 231 electrically connected to the detecting circuit assembly 221, a coil configuring circuit 241 electrically connected to the processor 21 and the coil 231, and a signal generator 25 electrically connected to the processor 21 and the detecting circuit assembly 221.

The detecting circuit assembly 221 includes a metallic FOD circuit 222 and a living object protection (LOP) circuit 223. The processor 21 is configured to output a detection designation signal to the detecting circuit assembly 221 so as to activate one of the metallic FOD circuit 222 and the LOP circuit 223.

Figure 2:
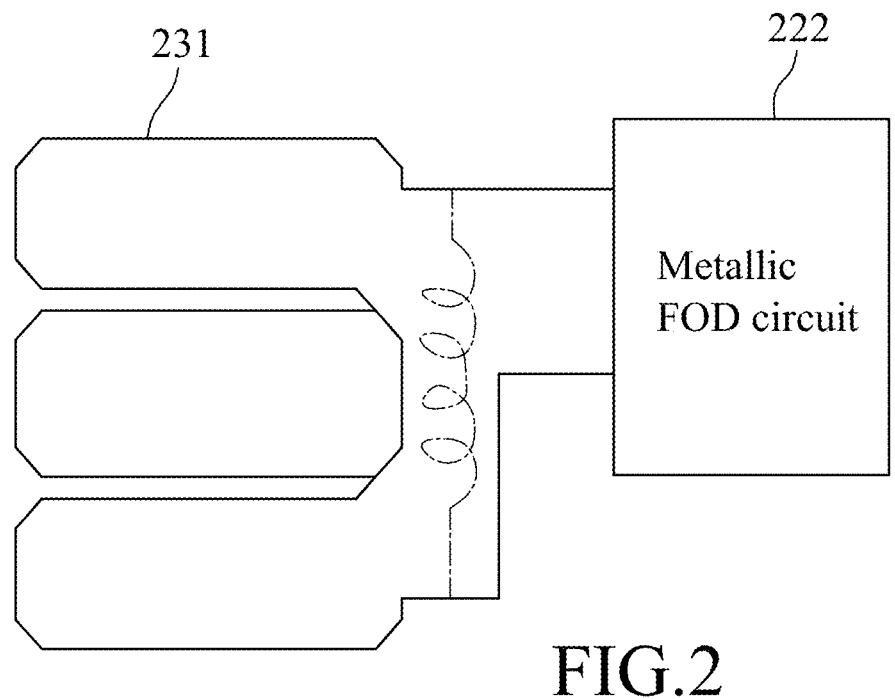
FIG. 2 is a schematic diagram illustrating a coil and a metallic FOD circuit of the first embodiment of the FOD device.
Figure 3:
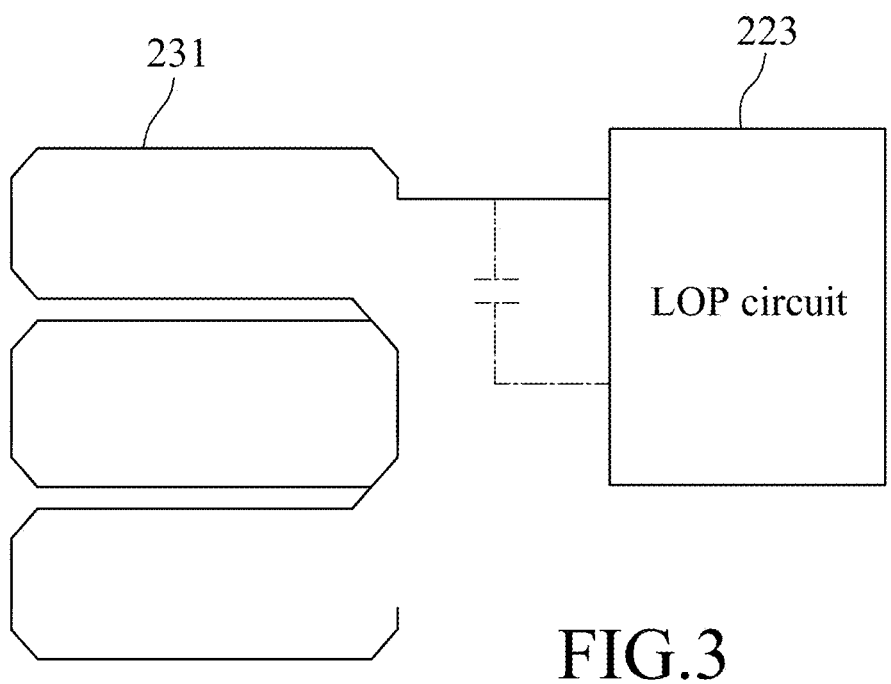
FIG. 3 is a schematic diagram illustrating the coil and a living object protection (LOP) circuit of the first embodiment of the FOD device.

Referring to FIGS. 2 and 3, the coil 231 is controllable to switch between a closed mode, where a switch (not shown) is controlled to be conducting so that the coil 231 and the metallic FOD circuit 222 of the detecting circuit assembly 221 cooperate to form a closed circuit (see FIG. 2), and an open mode, where the switch is controlled to be non-conducting so that the coil 231 and the LOP circuit 223 of the detecting circuit assembly 221 cooperate to form an open circuit.

The coil configuring circuit 241 is configured to control the coil 231 to switch to one of the closed mode and the open mode. The processor 21 is configured to output a control signal to the coil configuring circuit 241 so as to control the coil configuring circuit 241 to generate a switch signal. The switch signal is sent to the coil 231 to enable the coil 231 to switch to one of the closed mode and the open mode. The processor 21 further outputs a generation control signal to the signal generator 25 to control the signal generator 25 to transmit a test signal to the coil 231 via the LOP circuit 223 of the detecting circuit assembly 221 when the coil 231 is in the open mode.

The metallic FOD circuit 222 is configured to cooperate with the coil 231 that has switched to the closed mode to detect a metallic foreign object. The LOP circuit 223 is configured to cooperate with the coil 231 that has switched to the open mode to detect a living foreign object.

Specifically speaking, referring to FIG. 2, the coil 231 is inductive when the coil 231 is in the closed mode. The metallic FOD circuit 222 senses, by a signal processing circuit (not shown) of the metallic FOD circuit 222, an alternative current (AC) voltage between two terminals of the coil 231, and converts the AC voltage to a direct current (DC) electrical signal by an AC to DC converter (not shown) of the metallic FOD circuit 222. The magnitude of the DC electrical signal is a root mean square value of the AC voltage of the coil 231, and the DC electrical signal is outputted by the metallic FOD circuit 222 to the processor 21 as a voltage sensing signal that is associated with measurement of an effective value of voltage of the coil 231. The processor 21 determines whether the metallic foreign object is detected based on the voltage sensing signal.

Referring to FIG. 3, the coil 231 is capacitive when the coil 231 is in the open mode. The signal generator 25 is configured to generate the test signal according to the generation control signal received from the processor 21, and transmit the test signal to the coil 231 via an LC resonant circuit (not shown) included in the LOP circuit 223. The test signal is exemplified to be an AC voltage signal with constant frequency of 1 MHz. The LOP circuit 223 receives an AC current signal from the coil 231 that occurs in response to the test signal, measures a phase difference value between the test signal transmitted to the coil 231 and the AC current signal received from the coil 231, and transmits the phase difference value to the processor 21. The processor 21 controls the signal generator 25 according to the phase difference value to adjust the test signal until the coil 231 and the LC resonant circuit of the LOP circuit 223 are in resonance. Subsequently, the processor 21 receives a frequency sensing signal that is associated with measurement of resonant frequency at which the coil 231 and the detecting circuit assembly 221 resonate in response to the test signal, and that varies when the living foreign object appears close to the coil 231. Based on a variation of the frequency sensing signal, the processor 21 determines whether the living foreign object is detected.

Figure 13:
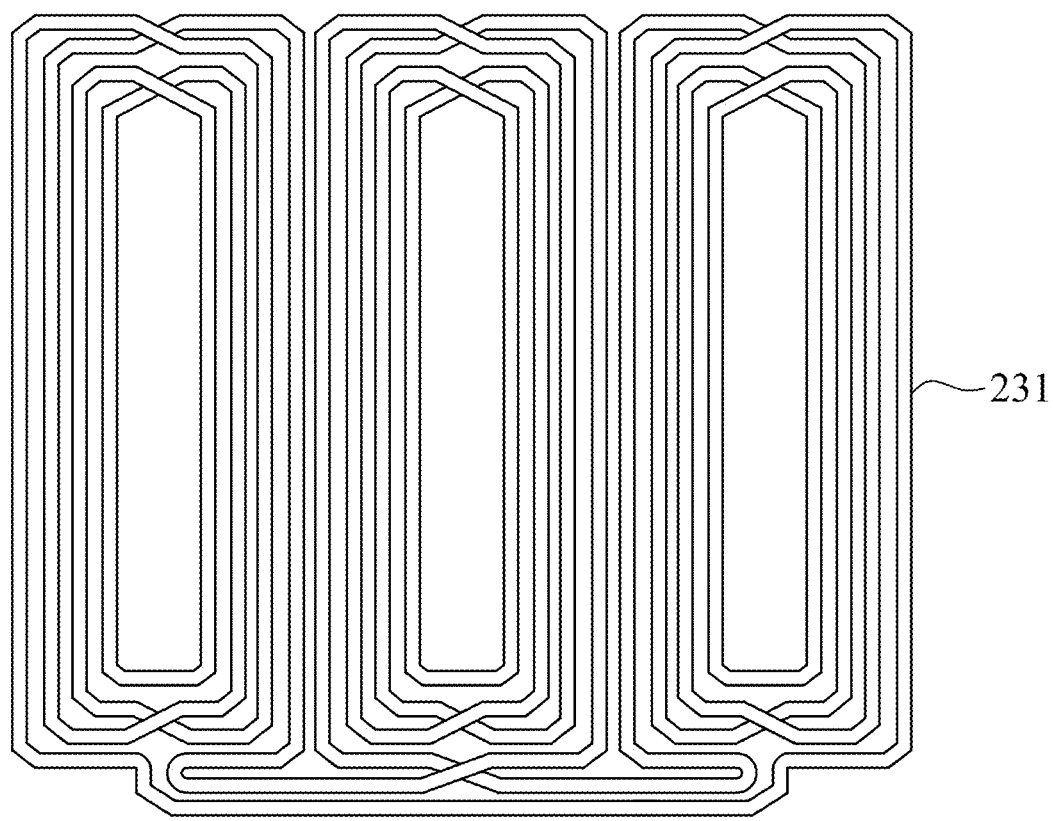
FIG. 13 is a schematic diagram illustrating an embodiment for each coil in the second embodiment of the FOD device according to the disclosure.

Referring to FIG. 13, in this embodiment, the coil 231 is structured as three coil elements that are serially connected and that are spaced apart from each other by an interval on an insulated baseboard. However, implementation of the structure of the coil 231 is not limited to the disclosure herein and may vary in other embodiments. For example, the coil 231 may be structured as a single coil.

In this embodiment, the processor 21 may be implemented by a Central Processing Unit (CPU), a Micro Control Unit (MCU), a microprocessor or any circuit configurable/programmable in a software manner and/or hardware manner to implement functionalities disclosed in this disclosure. Implementation of the processor 21 is not limited to what are disclosed herein and may vary in other embodiments.

Figure 4:
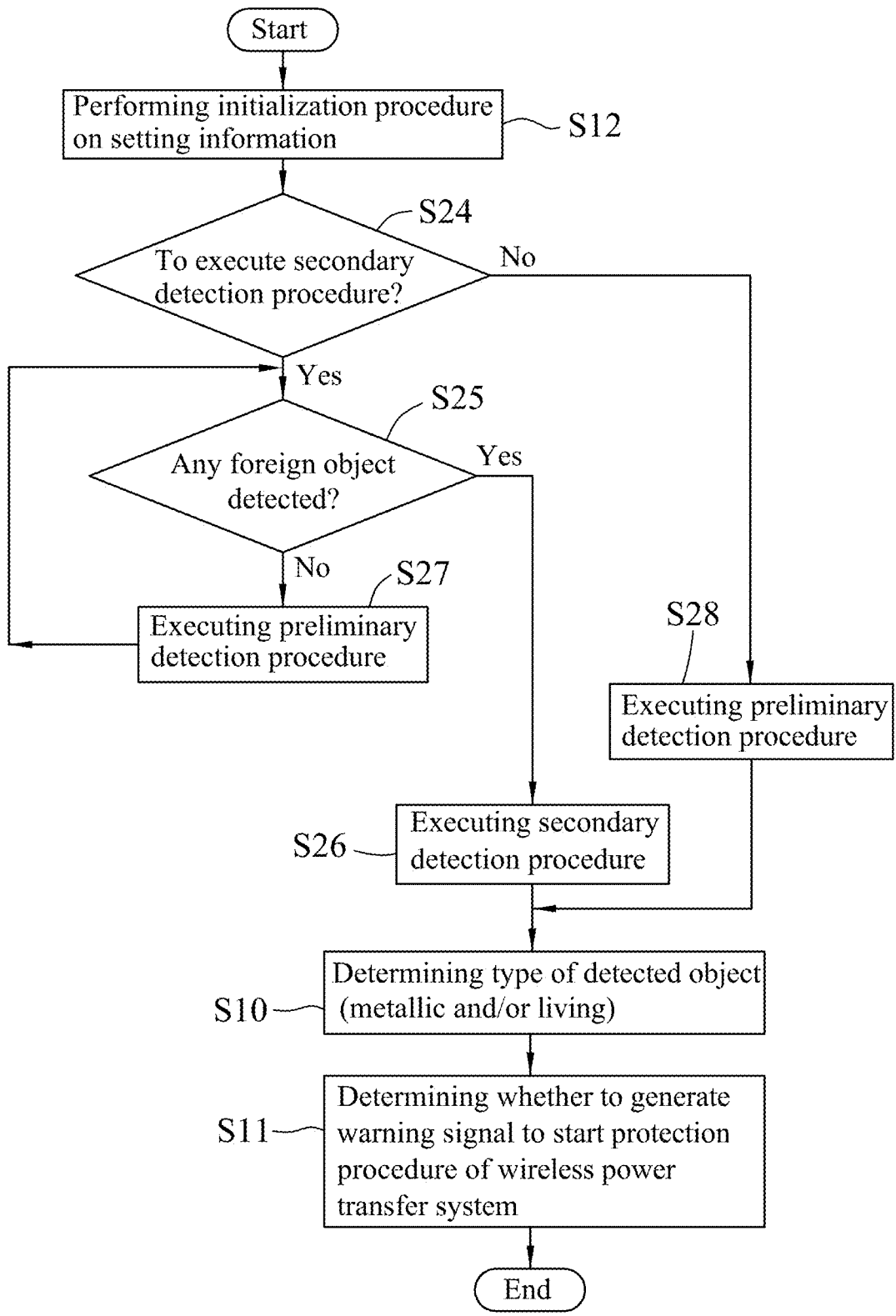
FIG. 4 is a flow chart illustrating a first embodiment of a method of FOD according to the disclosure.

Referring to FIGS. 1 and 4, a first embodiment of a method of FOD for a wireless power transfer system 3 according to the disclosure is illustrated. The method is to be implemented by the first embodiment of the FOD device 2 that is previously described. The method includes steps described as follows.

In step S12, the processor 21 performs an initialization procedure on setting information that is stored in the FOD device 2. The setting information is utilized by the processor 21 to execute the method of FOD. The setting information includes metallic indication information indicating a result of detection of metallic foreign object, living indication information indicating a result of detection of living foreign object, a secondary detection flag associated with execution of a secondary detection procedure, a parameter carried by the detection designation signal to be provided to the detecting circuit assembly 221, a parameter carried by the control signal to be provided to the coil configuring circuit 241, a parameter associated with transmission of the generation control signal to the signal generator 25, and a parameter associated with content contained in a warning signal. Specifically speaking, in this embodiment, the processor 21 sets the metallic indication information to indicate that no metallic foreign object is detected (i.e., resets the metallic indication information), sets the living indication information to indicate that no living foreign object is detected (i.e., resets the living indication information), sets the secondary detection flag to indicate that the secondary detection procedure has yet to be performed (i.e., resets the secondary detection flag), and resets the parameters such that the detection designation signal is outputted to activate the metallic FOD circuit 222 by default, that the control signal is outputted to switch the coil 231 to the closed mode by default, and that the generation control signal and the warning signal are not generated. Thereafter, a flow of execution of the method of FOD proceeds to step S24.

Figure 6:
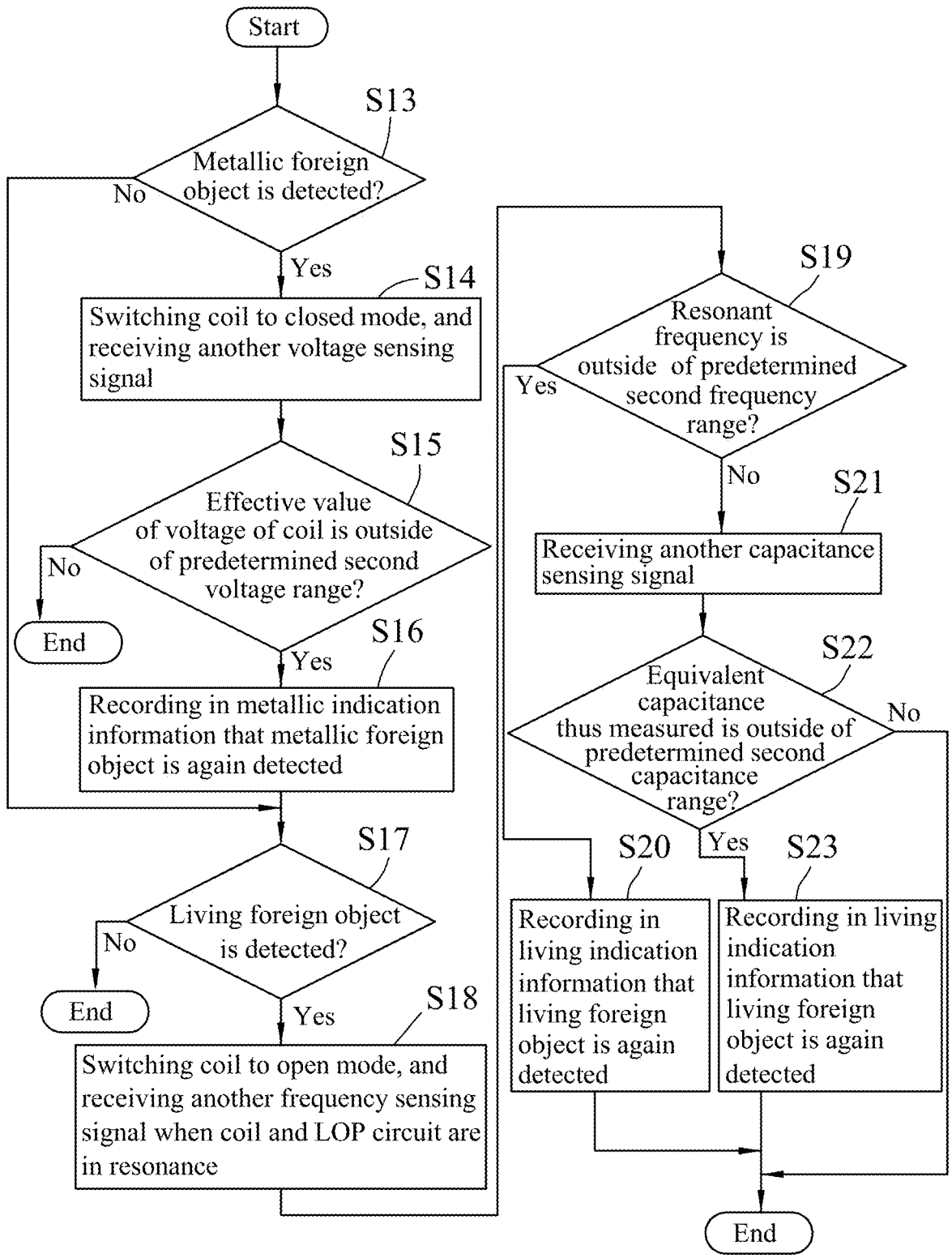
FIG. 6 is flow chart illustrating an embodiment of a secondary detection procedure of the method of FOD according to the disclosure.

In step S24, based on the secondary detection flag included in the setting information, the processor 21 determines whether to execute the secondary detection procedure which includes steps S13 to S23 that are shown in FIG. 6. The secondary detection procedure is performed in order to reduce the possibility of occurrence of false alarm. When it is determined to proceed to the secondary detection procedure, the flow proceeds to step S25. Otherwise, the flow proceeds to step S28. In this embodiment, a value of one of the secondary detection flag indicates that the secondary detection procedure is required to be performed, and the value of zero of the secondary detection flag indicates that the secondary detection procedure is not required to be performed.

In step S25, based on the metallic indication information and the living indication information, the processor 21 determines whether a metallic foreign object, a living foreign object or both have been detected. When it is determined by the processor 21 that any foreign object, metallic, or living have been detected, the flow proceeds to step S26. On the other hand, when it is determined by the processor 21 that none of a metallic foreign object and a living foreign object has been detected, the flow proceeds to step S27.

In step S26, the processor 21 executes the secondary detection procedure that includes S13 to S23 as shown in FIG. 6. Then, the flow proceeds to step S10.

Figure 5:
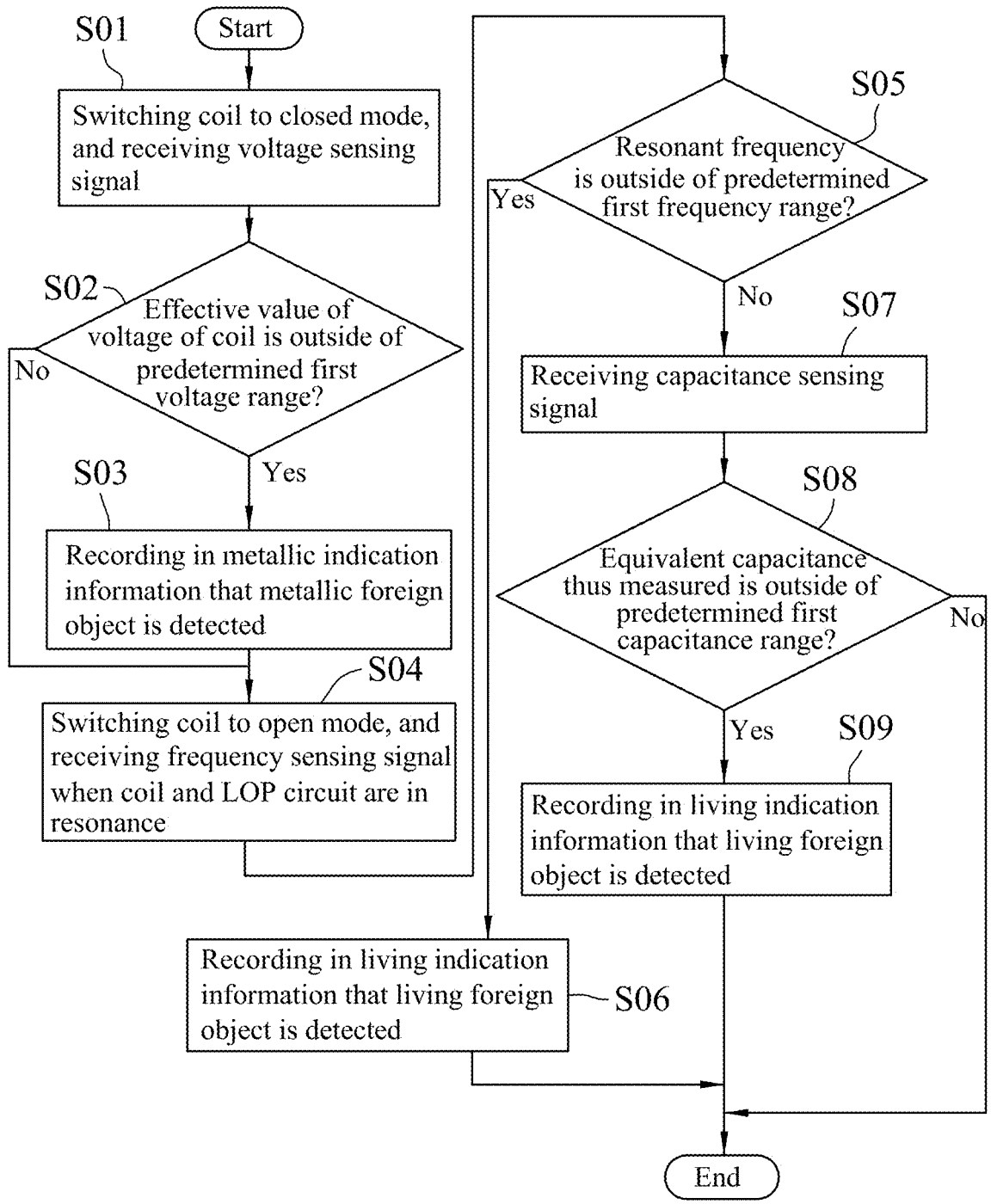
FIG. 5 is flow chart illustrating an embodiment of a preliminary detection procedure of the method of FOD according to the disclosure.

In step S27, the processor 21 executes a preliminary detection procedure that includes steps S01 to S09 as shown in FIG. 5. Then, the flow returns to step S25.

In step S28, the processor 21 executes the preliminary detection procedure that includes steps S01 to S09 as shown in FIG. 5. Then, the flow proceeds to step S10.

In step S10, based on the metallic indication information and the living indication information, the processor 21 determines a type (metallic and/or living) of the object detected (i.e., determines whether a metallic foreign object, a living foreign object, or both a metallic foreign object and a living foreign object are detected). Then, the flow proceeds to step S11.

In step S11, based on the metallic indication information and the living indication information, the processor 21 determines whether to generate the warning signal for triggering a protection procedure of the wireless power transfer system 3, such as cut off the power to the wireless power transfer system 3 that is required for energy transmission. Thereafter, the flow terminates.

Referring to FIGS. 1 and 5, the preliminary detection procedure includes steps S01 to S09 described as follows.

In step S01, the processor 21 triggers output of the switch signal by the coil configuring circuit 241 for enabling the coil 231 to switch to the closed mode, where the coil 231 and the metallic FOD circuit 222 of the detecting circuit assembly 221 form the closed circuit. The processor 21 then receives, from the metallic FOD circuit 222 of the detecting circuit assembly 221, the voltage sensing signal that is associated with measurement of the effective value of voltage of the coil 231. Then, the flow proceeds to step S02.

In step S02, based on the voltage sensing signal, the processor 21 determines whether the effective value of the voltage of the coil 231 is outside of a predetermined first voltage range. In this embodiment, the predetermined first voltage range is defined by a predetermined first upper limit of voltage range and a predetermined first lower limit of voltage range that are included in the setting information. When it is determined by the processor 21 that the effective value of the voltage of the coil 231 is outside of the predetermined first voltage range, the flow proceeds to step S03. Otherwise, the flow proceeds to step S04.

In step S03, the processor 21 records in the metallic indication information that a metallic foreign object is detected. Then, the flow proceeds to step S04.

In step S04, the processor 21 triggers output of the switch signal by the coil configuring circuit 241 to enable the coil 231 to switch to the open mode, where the coil 231 and the LOP circuit 223 of the detecting circuit assembly 221 form the open circuit. Then, the processor 21 outputs the generation control signal to the signal generator 25, to enable the signal generator 25 to generate and transmit the test signal to the coil 231 via the LOP circuit 223. The processor 21 then receives the frequency sensing signal from the LOP circuit 223 of the detecting circuit assembly 221. When the coil 231 and the LC resonant circuit of the LOP circuit 223 are in resonance, the frequency sensing signal received by the processor 21 indicates the resonant frequency. Then, the flow proceeds to step S05.

In step S05, based on the frequency sensing signal, the processor 21 determines whether the resonant frequency is outside of a predetermined first frequency range. In this embodiment, the predetermined first frequency range is defined by a predetermined first upper limit of frequency range and a predetermined first lower limit of frequency range that are included in the setting information. When it is determined by the processor 21 that the resonant frequency is outside of the predetermined first frequency range, the flow proceeds to step S06. Otherwise, the flow proceeds to step S07.

In step S06, the processor 21 records in the living indication information that a living foreign object is detected. Then, the flow proceeds to an end of the preliminary detection procedure.

In step S07, the processor 21 receives from the LOP circuit 223 of the detecting circuit assembly 221, a capacitance sensing signal that is associated with measurement of equivalent capacitance of the coil 231. Then, the flow proceeds to step S08.

In step S08, based on the capacitance sensing signal, the processor 21 determines whether the equivalent capacitance thus measured is outside of a predetermined first capacitance range. In this embodiment, the predetermined first capacitance range is defined by a predetermined first upper limit of capacitance range and a predetermined first lower limit of capacitance range that are included in the setting information. When it is determined that the equivalent capacitance thus measured is outside of the predetermined first capacitance range, the flow proceeds to step S09. Otherwise, the flow proceeds to the end of the preliminary detection procedure.

In step S09, the processor 21 records in the living indication information that a living foreign object is detected. Then, the flow proceeds to the end of the preliminary detection procedure.

Referring to FIGS. 1 and 6, the secondary detection procedure includes steps S13 to S23 described as follows.

In step S13, based on the metallic indication information, the processor 21 determines whether a metallic foreign object is detected. When it is determined by the processor 21 that a metallic foreign object is detected, the flow proceeds to step S14. Otherwise, the flow proceeds to step S17.

In step S14, the processor 21 triggers output of the switch signal by the coil configuring circuit 241 to enable the coil 231 to switch to the closed mode, and receives, from the metallic FOD circuit 222 of the detecting circuit assembly 221, another voltage sensing signal that is associated with measurement of the effective value of voltage of the coil 231. Then, the flow proceeds to step S15.

In step S15, based on said another voltage sensing signal, the processor 21 determines whether the effective value of the voltage of the coil 231 is outside of a predetermined second voltage range. In this embodiment, the predetermined second voltage range is defined by a predetermined second upper limit of voltage range and a predetermined second lower limit of voltage range that are included in the setting information. The predetermined second voltage range and the predetermined first voltage range are the same in this embodiment, but may be different in other embodiments. When it is determined by the processor 21 that the effective value of the voltage of the coil 231 is outside of the predetermined second voltage range, the flow proceeds to step S16. Otherwise, the flow proceeds to an end of the secondary detection procedure.

In step S16, the processor 21 records in the metallic indication information that a metallic foreign object is again detected. Then, the flow proceeds to step S17.

In step S17, based on the living indication information, the processor 21 determines whether a living foreign object is detected. When it is determined by the processor 21 that a living foreign object is detected, the flow proceeds to step S18. Otherwise, the flow proceeds to the end of the secondary detection procedure.

In step S18, the processor 21 triggers output of the switch signal by the coil configuring circuit 241 to enable the coil 231 to switch to the open mode. The processor 21 then outputs the generation control signal to the signal generator 25, to enable the signal generator 25 to generate another test signal and to transmit said another test signal to the coil 231 via the LOP circuit 223. The signal generator 25 is controlled according to the generation control signal to adjust the another test signal until the coil 231 and the LC circuit of the LOP circuit 223 are in resonance. In this way, the processor 21 receives from the LOP circuit 223 of the detecting circuit assembly 221, another frequency sensing signal that is associated with measurement of resonant frequency at which the coil 231 and the LOP circuit 223 of the detecting circuit assembly 221 resonate in response to said another test signal. Then, the flow proceeds to step S19.

In step S19, based on said another frequency sensing signal, the processor 21 determines whether the resonant frequency is outside of a predetermined second frequency range. In this embodiment, the predetermined second frequency range is defined by a predetermined second upper limit of frequency range and a predetermined second lower limit of frequency range that are included in the setting information. The predetermined second frequency range and the predetermined first frequency range are the same in this embodiment, but may be different in other embodiments. When it is determined that the resonant frequency is outside of the predetermined second frequency range, the flow proceeds to step S20. Otherwise, the flow proceeds to step S21.

In step S20, the processor 21 records in the living indication information that a living foreign object is again detected. Then, the flow proceeds to the end of the secondary detection procedure.

In step S21, the processor 21 receives from the LOP circuit 223 of the detecting circuit assembly 221, another capacitance sensing signal that is associated with measurement of equivalent capacitance of the coil 231. Then, the flow proceeds to step S22.

In step S22, based on said another capacitance sensing signal, the processor 21 determines whether the equivalent capacitance thus measured is outside of a predetermined second capacitance range. In this embodiment, the predetermined second capacitance range is defined by a predetermined second upper limit of capacitance range and a predetermined second lower limit of capacitance range that are included in the setting information. The predetermined second capacitance range and the predetermined first capacitance range are the same in this embodiment, but may be different in other embodiments. When it is determined that the equivalent capacitance thus measured is outside of the predetermined second capacitance range, the flow proceeds to step S23. Otherwise, the flow proceeds to the end of the secondary detection procedure.

In step S23, the processor 21 records in the living indication information that a living foreign object is again detected. Then, the flow proceeds to the end of the secondary detection procedure.

It should be noted that the secondary detection procedure is optional. In some embodiments, the method of FOD merely executes the preliminary detection procedure, and skips the secondary detection procedure.

Figure 7:
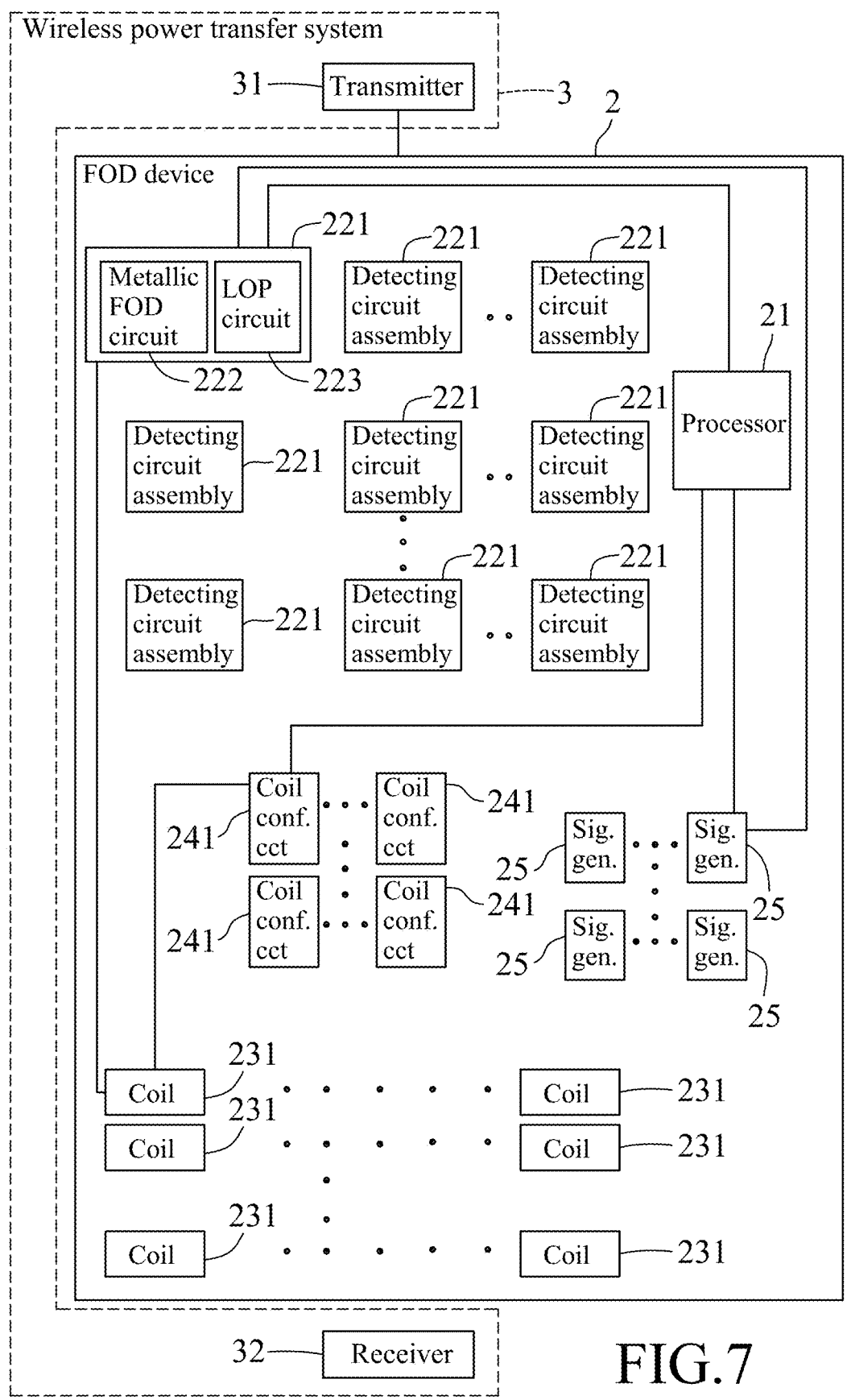
FIG. 7 is a block diagram illustrating a second embodiment of the FOD device according to the disclosure.

Referring to FIG. 7, a second embodiment of the FOD device 2 according to the disclosure is illustrated. The FOD device 2 is disposed between the transmitter 31 and the receiver 32 of the wireless power transfer system 3. The second embodiment is similar to the first embodiment of the FOD device 2, but is different in what are described as follows.

There are plural detecting circuit assemblies 221, and also plural coils 231. The coils 231 form an array of coils, a portion of which is adapted to be utilized for detection of metallic foreign objects and the other portion of which is utilized for detection of living foreign objects. With the array of coils, sensitivity of detection, accuracy of detection and detection range may be promoted. Each of the coils 231 is electrically connected to a respective one of the detecting circuit assemblies 221. There are also plural coil configuring circuits 241 (shortened to "coil conf. cct" in FIG. 7). Each of the coil configuring circuits 241 is electrically connected to the processor 21 and a respective one of the coils 231, and is configured to output the switch signal based on the control signal received from the processor 21 to enable the respective one of the coils 231 to switch to one of the closed mode and the open mode, such that arrangement of those coils 231 in the closed mode with respect to those coils 231 in the open mode complies with a predetermined configuration pattern (see FIGS. 9-12). In addition, there are plural signal generators 25 (shortened to "sig. gen." in FIG. 7). Each of the signal generators 25 is electrically connected to the processor 21 and a respective one of the detecting circuit assemblies 221, and is configured to be controlled by the processor 21 to transmit the test signal to the respective one of the coils 231 when the respective one of the coils 231 is controlled based on the predetermined configuration pattern to switch to the open mode. For each of the detecting circuit assemblies 221, the metallic FOD circuit 222 is configured to cooperate with the respective one of the coils 231 that is in the closed mode to detect metallic foreign objects, and the LOP circuit 223 is configured to cooperate with the respective one of the coils 231 that is in the open mode to detect living foreign objects. The processor 21 is configured to output the detection designation signal sequentially to the detecting circuit assemblies 221 so as to activate, for each of the detecting circuit assemblies 221, one of the metallic FOD circuit 222 and the LOP circuit 223 thereof based on the predetermined configuration pattern.

It is worthy to note that in FIG. 7, for the sake of clarity of illustration, the processor 21 is exemplarily illustrated to be connected to one of the detecting circuit assemblies 221, one of the coil configuring circuits 241 and one of the signal generators 25, but in practice, the processor 21 is connected to all of the detecting circuit assemblies 221, all of the coil configuring circuits 241 and all of the signal generators 25. For a similar reason, one of the coils 231 is illustrated to be connected to the respective one of the coil configuring circuits 241 and to the respective one of the detecting circuit assemblies 221.

In this embodiment, the coils 231 are forty nine in number, and form a seven-by-seven array. However, implementation of the number of the coils is not limited to the disclosure herein and may vary in other embodiments.

Figure 8A:
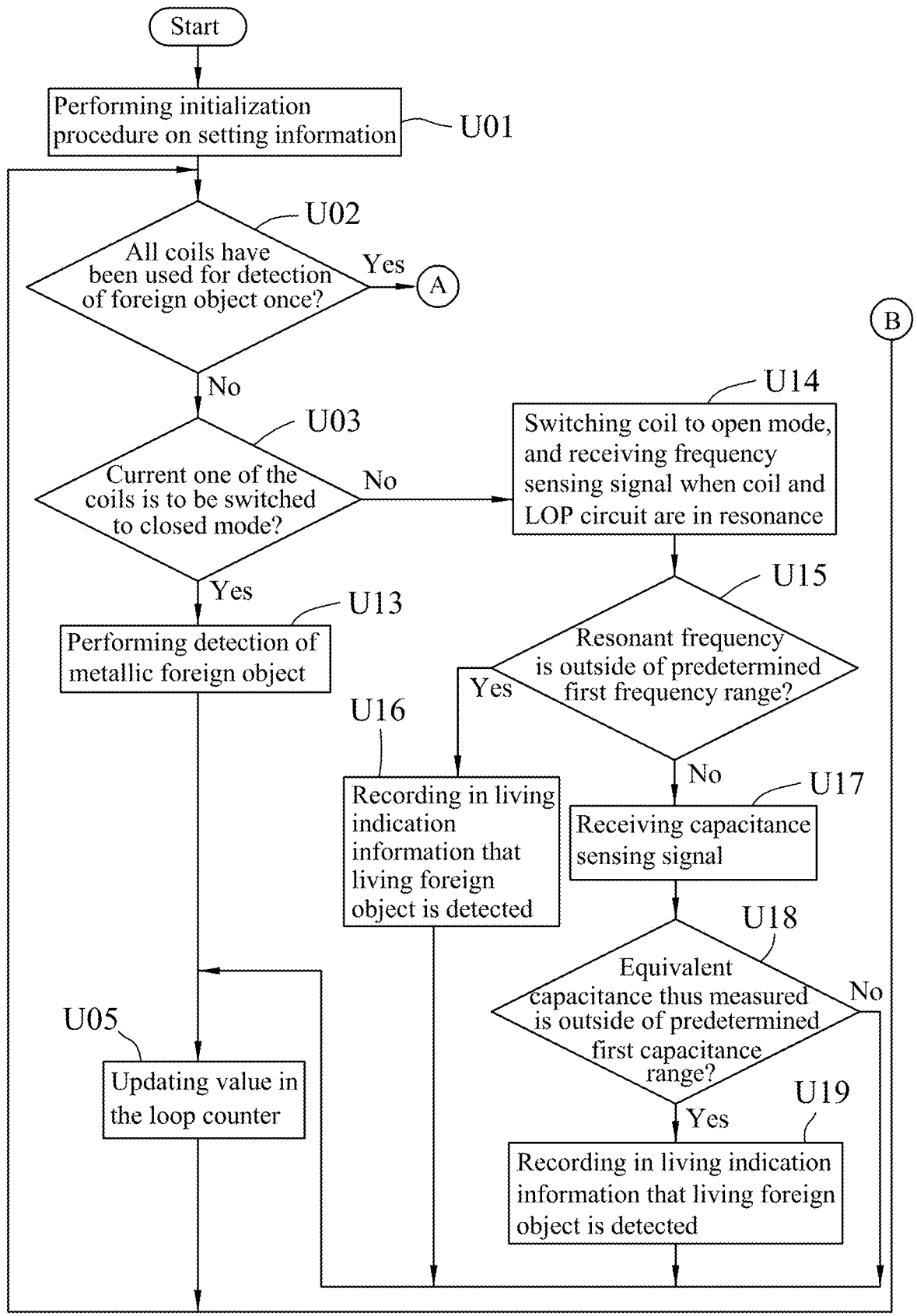
FIGS. 8A and 8B cooperatively form a flow chart illustrating a second embodiment of the method of FOD according to the disclosure.
Figure 8B:
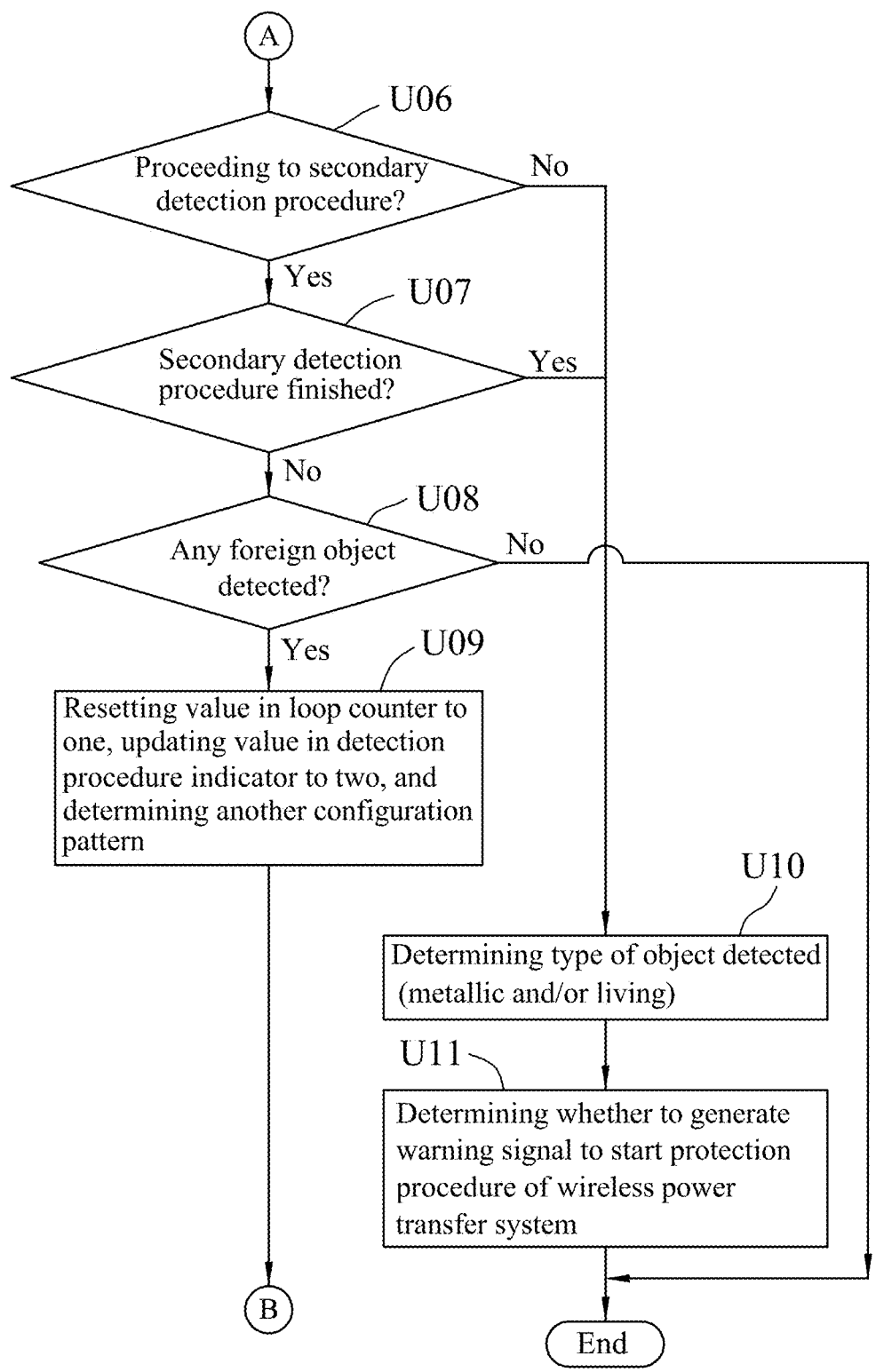
Figure 9:
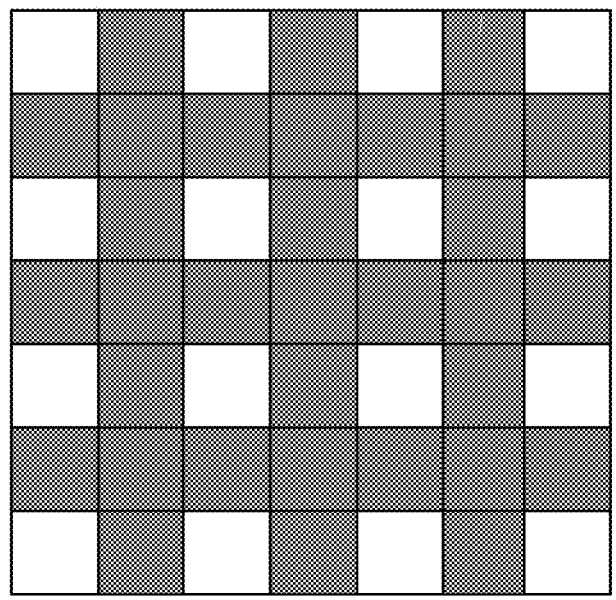
FIGS. 9 to 12 are schematic diagrams illustrating embodiments of predetermined configuration patterns to be complied by arrangement of coils in a closed mode with respect to coils in an open mode in the second embodiment of the FOD device according to the disclosure.
Figure 10:
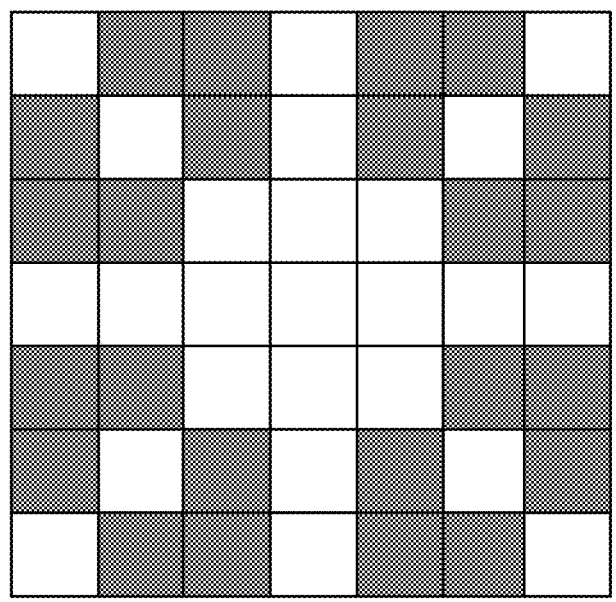
Figure 11:
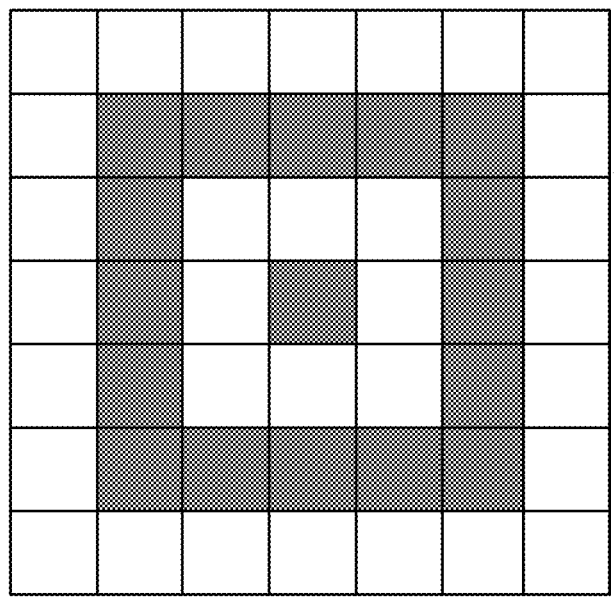
Figure 12:
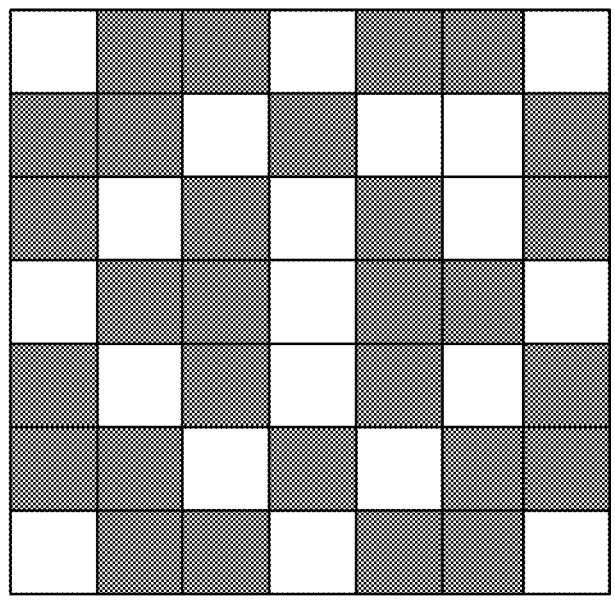

Referring to FIGS. 7, 8A and 8B, a second embodiment of the method of FOD for the wireless power transfer system 3 is illustrated. The method is to be implemented by the second embodiment of the FOD device 2 that is previously described. The method includes steps described as follows.

In step U01, the processor 21 performs the initialization procedure on the setting information. Since step U01 is similar to step S12, similar content such as resetting the metallic indication information and the living indication information is omitted herein for the sake of brevity. However, in this embodiment, the setting information further includes a loop counter that indicates which one of the coils 231 is to be utilized for detection, and a detection procedure indicator that indicates which one of the preliminary detection procedure and the secondary detection procedure is executed. The processor 21 further sets a value in the loop counter to be one, sets a value in the detection procedure indicator to be one, which indicates that the preliminary detection procedure is executed, and designates the predetermined configuration pattern to be complied by the arrangement of the coils 231 in the closed mode with respect to the coils 231 in the open mode. Then, the flow proceeds to step U02.

In step U02, based on the value in the loop counter, the processor 21 determines whether all of the coils 231 have been used for the detection of foreign object once. In other words, in this embodiment, the processor 21 determines whether the value in the loop counter is greater than forty nine (i.e., the total number of the coils 231). When it is determined by the processor 21 that at least one of the coils 231 has not been used for the detection of foreign object, i.e., the value in the loop counter is not greater than forty nine, the flow proceeds to step U03. On the other hand, when it is determined by the processor 21 that all of the coils 231 have been used for the detection of foreign object once, i.e., the value in the loop counter is greater than forty nine, the flow proceeds to step U06.

In step U03, based on the predetermined configuration pattern and the value in the loop counter, the processor 21 determines which one of the closed mode and the open mode one of the coils 231 the switch signal is to be outputted to is to switch to, where the one of the coils 231 corresponds to the value in the loop counter. When it is determined by the processor 21 that the closed mode is to be switched to, the flow proceeds to step U13. On the other hand, when it is determined by the processor 21 that the open mode is to be switched to, the flow proceeds to step U14. It is worth to note that the determination in step U03 may be implemented to determine whether one of the coils 231 corresponding to the value in the loop counter is to be switched to the closed mode. When a result of the determination is affirmative, i.e., the one of the coils 231 is to be switched to the closed mode, the flow proceeds to step U13. When the result of the determination is negative, i.e., the one of the coils 231 is to be switched to the open mode, the flow proceeds to step U14.

In step U13, the processor 21 triggers output of the switch signal by a corresponding one of the coil configuring circuits 241 for enabling the one of the coils 231 to switch to the closed mode, and receives, from the metallic FOD circuit 222 of a corresponding one of the detecting circuit assemblies 221, the voltage sensing signal that is associated with measurement of the effective value of voltage of the one of the coils 231. Based on the voltage sensing signal, the processor 21 determines whether the effective value of the voltage of the one of the coils 231 is outside of the predetermined first voltage range. The processor 21 records in the metallic indication information that a metallic foreign object is detected when it is determined by the processor 21 that the effective value of the voltage of the one of the coils 231 is outside of the predetermined first voltage range. Then, the flow proceeds to step U05.

In step U05, the processor 21 updates the value in the loop counter by adding one to the value in the loop counter. Then, the flow returns to step U02.

In step U14, the processor 21 triggers output of the switch signal by the corresponding one of the coil configuring circuits 241 to enable the one of the coils 231 to switch to the open mode. Then, the processor 21 outputs the generation control signal to a corresponding one of the signal generators 25, to enable the corresponding one of the signal generators 25 to generate and transmit the test signal to the one of the coils 231 via the LOP circuit 223 of the corresponding one of the detecting circuit assemblies 221. The processor 21 then receives the frequency sensing signal from the LOP circuit 223 of the corresponding one of the detecting circuit assemblies 221. When the one of the coils 231 and the LC resonant circuit of the LOP circuit 223 of the corresponding one of the detecting circuit assemblies 221 are in resonance, the frequency sensing signal received by the processor 21 indicates the resonant frequency. Then, the flow proceeds to step U15.

In step U15, based on the frequency sensing signal, the processor 21 determines whether the resonant frequency is outside of the predetermined first frequency range. When it is determined by the processor that the resonant frequency is outside of the predetermined first frequency range, the flow proceeds to step U16. Otherwise, the flow proceeds to step U17.

In step U16, the processor 21 records in the living indication information that a living foreign object is detected. Then, the flow proceeds to step U05.

In step U17, the processor 21 receives from the LOP circuit 223 of the corresponding one of the detecting circuit assemblies 221, the capacitance sensing signal that is associated with measurement of equivalent capacitance of the one of the coils 231. Then, the flow proceeds to step U18.

In step U18, based on the capacitance sensing signal, the processor 21 determines whether the equivalent capacitance thus measured is outside of the predetermined first capacitance range. When it is determined that the equivalent capacitance thus measured is outside of the predetermined first capacitance range, the flow proceeds to step U19. Otherwise, the flow proceeds to the U05.

In step U19, the processor 21 records in the living indication information that a living foreign object is detected. Then, the flow proceeds to U05.

Referring to FIG. 8B, in step U06, based on the secondary detection flag included in the setting information, the processor 21 determines whether to proceed to the secondary detection procedure. When it is determined to proceed to the secondary detection procedure, the flow proceeds to step U07. Otherwise, the flow proceeds to step U10.

In step U07, based on the value in the detection procedure indicator, the processor 21 determines whether the secondary detection procedure has been finished. In other words, in this embodiment, the processor 21 determines whether the value in the detection procedure indicator is equal to two. When it is determined that the secondary detection procedure has not been finished, i.e., the value in the detection procedure indicator is not equal to two, the flow proceeds to step U08. Otherwise, when it is determined that the secondary detection procedure has been finished, i.e., the value in the detection procedure indicator is equal to two, the flow proceeds to step U10.

In step U08, based on the metallic indication information and the living indication information, the processor 21 determines whether a metallic foreign object, a living foreign object or both are detected. When it is determined that a metallic foreign object, a living foreign object or both are detected, the flow proceeds to step U09. Otherwise, the flow proceeds to an end.

In step U09, the processor 21 resets the value in the loop counter to one, updates the value in the detection procedure indicator to two, and determines, based on the metallic indication information and the living indication information, another configuration pattern to serve as the predetermined configuration pattern, which is to be complied by the arrangement of the coils 231 in the closed mode with respect to the coils 231 in the open mode. Then, the flow proceeds to step U02.

In step U10, based on the metallic indication information and the living indication information, the processor 21 determines the type of foreign object detected (metallic and/or living). Then, the flow proceeds to step U11.

In step U11, based on the metallic indication information and the living indication information, the processor 21 determines whether to generate the warning signal for triggering the protection procedure of the wireless power transfer system 3. Thereafter, the flow proceeds to the end.

It should be noted that the secondary detection procedure is optional. In some embodiments, the method of FOD merely executes the preliminary detection procedure, and skips the secondary detection procedure.

Additionally, it should be noted that formation of the predetermined configuration pattern is programmable. That is to say, the predetermined configuration pattern may be programmed to be selected from one of configuration patterns shown in FIGS. 9 to 12, where one shaded block corresponds to one of the coils 231 that is in the closed mode for detection of metallic foreign objects, and one white block corresponds to one of the coils 231 that is in the open mode for detection of living foreign objects. In this way, sensitivity of detection of foreign objects may be variable by selecting different one of the configuration patterns.

In addition, the predetermined configuration patterns utilized in the preliminary detection procedure and in the secondary detection procedure are different in this embodiment. For the predetermined configuration pattern utilized in the preliminary detection procedure, the coils 231 that are designated to be switched to the closed mode and the coils 231 that are designated to be switched to the open mode would be more evenly distributed as compared to the predetermined configuration pattern utilized in the secondary detection procedure (i.e., the another configuration pattern). However, implementation of the predetermined configuration patterns respectively utilized in the preliminary detection procedure and the secondary detection procedure (in terms of distribution of the white and shaded blocks) is not limited to the disclosure herein, and the predetermined configuration patterns respectively utilized in the preliminary detection procedure and the secondary detection procedure may be the same in other embodiments.

Moreover, determination of the configuration pattern utilized in the secondary detection procedure may be programmed to be dependent on the result of detection of foreign object(s) in the preliminary detection procedure (e.g., depending on which kind of foreign object is detected, or on a number of times of determination that one of a metallic foreign object, a living foreign object and the combination thereof is detected) so as to improve accuracy of detection and to reduce occurrence of false alarm.

To sum up, by integrating the metallic FOD circuit 222 and the LOP circuit 223 and by switching the coil 231 between the open mode and the closed mode, the FOD device 2 according to the disclosure is capable of utilizing a single coil (or a single coil array) for both detection of metallic foreign objects and detection of living foreign objects. Because of hardware integration, manufacturing cost is reduced. At the same time, complexity of the overall system is reduced, so efficiency of energy transmission of the wireless power transfer system 3 may be enhanced.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A method of foreign object detection (FOD) for a wireless power transfer system, the method to be implemented by an FOD device, which includes a processor, a detecting circuit assembly that is electrically connected to the processor, and a coil that is electrically connected to the detecting circuit assembly and that is controllable to switch between a closed mode and an open mode, the method comprising:
   (a) by the processor, triggering output of a switch signal for enabling the coil to switch to the closed mode, where the coil and the detecting circuit assembly form a closed circuit, and receiving, from the detecting circuit assembly, a voltage sensing signal that is associated with measurement of an effective value of voltage of the coil;
   (b) by the processor based on the voltage sensing signal, determining whether the effective value of the voltage of the coil is outside of a predetermined first voltage range;
   (c) by the processor, when it is determined that the effective value of the voltage of the coil is outside of the predetermined first voltage range, recording in metallic indication information that a metallic foreign object is detected;
   (d) by the processor, triggering output of the switch signal to enable the coil to switch to the open mode, where the coil and the detecting circuit assembly form an open circuit, controlling transmission of a test signal to the coil, and receiving from the detecting circuit assembly, a frequency sensing signal that is associated with measurement of resonant frequency at which the coil and the detecting circuit assembly resonate in response to the test signal;
   (e) by the processor based on the frequency sensing signal, determining whether the resonant frequency is outside of a predetermined first frequency range; and
   (f) by the processor when it is determined that the resonant frequency is outside of the predetermined first frequency range, recording in living indication information that a living foreign object is detected.

2. The method as claimed in claim 1, further comprising:
   (g) by the processor, receiving from the detecting circuit assembly, a capacitance sensing signal that is associated with measurement of equivalent capacitance of the coil;
   (h) by the processor based on the capacitance sensing signal, determining whether the equivalent capacitance thus measured is outside of a predetermined first capacitance range; and
   (i) by the processor when it is determined that the equivalent capacitance thus measured is outside of the predetermined first capacitance range, recording in the living indication information that a living foreign object is detected.

3. The method as claimed in claim 2, further comprising:
   (j) by the processor based on the metallic indication information and the living indication information, determining whether a metallic foreign object, a living foreign object or both a metallic foreign object and a living foreign object are detected;
   (k) by the processor based on the metallic indication information and the living indication information, determining whether to generate a warning signal; and
   (l) by the processor, resetting the metallic indication information and the living indication information.

4. The method as claimed in claim 3, further comprising:
   (m) by the processor based on the metallic indication information, determining whether a metallic foreign object is detected;
   (n) by the processor when it is determined that a metallic foreign object is detected, triggering output of the switch signal to enable the coil to switch to the closed mode, and receiving, from the detecting circuit assembly, another voltage sensing signal that is associated with measurement of the effective value of voltage of the coil;
   (o) by the processor based on said another voltage sensing signal, determining whether the effective value of the voltage of the coil is outside of a predetermined second voltage range;
   (p) by the processor when it is determined that the effective value of the voltage of the coil is outside of the predetermined second voltage range, recording in the metallic indication information that a metallic foreign object is again detected;
   (q) by the processor based on the living indication information, determining whether a living foreign object is detected;
   (r) by the processor when it is determined that a living foreign object is detected, triggering output of the switch signal to enable the coil to switch to the open mode, controlling transmission of another test signal to the coil, and receiving from the detecting circuit assembly, another frequency sensing signal that is associated with measurement of resonant frequency at which the coil and the detecting circuit assembly resonate in response to said another test signal;
   (s) by the processor based on said another frequency sensing signal, determining whether the resonant frequency is outside of a predetermined second frequency range; and
   (t) by the processor when it is determined that the resonant frequency is outside of the predetermined second frequency range, recording in the living indication information that a living foreign object is again detected.

5. The method as claimed in claim 4, further comprising:
   (u) by the processor, receiving from the detecting circuit assembly, another capacitance sensing signal that is associated with measurement of equivalent capacitance of the coil;
   (v) by the processor based on said another capacitance sensing signal, determining whether the equivalent capacitance thus measured is outside of a predetermined second capacitance range; and
   (w) by the processor when it is determined that the equivalent capacitance thus measured is outside of the predetermined second capacitance range, recording in the living indication information that a living foreign object is again detected.

6. The method as claimed in claim 5, further comprising:
   (x) by the processor based on a secondary detection flag, determining whether to execute a secondary detection procedure including steps of (m) to (w); and
   (y) by the processor when it is determined to execute the secondary detection procedure, determining, based on the metallic indication information and the living indication information, whether one of a metallic foreign object, a living foreign object and the combination thereof has been detected, and executing the secondary detection procedure when it is determined that one of a metallic foreign object, a living foreign object and the combination thereof has been detected.

7. The method as claimed in claim 2, the detecting circuit assembly being plural in number, the coil being plural in number, the coils being electrically and respectively connected to the detecting circuit assemblies, the FOD device further including a plurality of coil configuring circuits each of which is electrically connected to the processor and a respective one of the coils, and each of which is triggered by the processor to output the switch signal for enabling the respective one of the coils to switch to one of the closed mode and the open mode such that arrangement of those of the coils in the closed mode with respect to those of the coils in the open mode complies with a predetermined configuration pattern, the method further comprising:
- (A) by the processor, determining, based on a value in a loop counter, whether all of the coils have been used for the detection of foreign object once;
- (B) by the processor when it is determined that at least one of the coils has not been used for the detection of foreign object, determining, based on the predetermined configuration pattern and the value in the loop counter, which one of the closed mode and the open mode one of the coils that corresponds to the value in the loop counter the switch signal is to be outputted to is to switch to; and
- (C) by the processor, updating the value in the loop counter.

8. The method as claimed in claim 7, further comprising:
- (D) by the processor when it is determined that all of the coils have been used for the detection of foreign object once, determining, based on a secondary detection flag, whether to proceed to a secondary detection procedure; and
- (E) by the processor when it is determined to proceed to the secondary detection procedure, determining, based on a value in a detection procedure indicator, whether the secondary detection procedure has been finished;
- (F) by the processor when it is determined that the secondary detection procedure has not been finished, determining, based on the metallic indication information and the living indication information, whether one of a metallic foreign object, a living foreign object and a combination thereof is detected; and
- (G) by the processor when it is determined that one of a metallic foreign object, a living foreign object and the combination thereof is detected, resetting the loop counter, updating the value in the detection procedure indicator, and determining, based on the metallic indication information and the living indication information, another configuration pattern to serve as the predetermined configuration pattern, which is to be complied by arrangement of those of the coils in the closed mode with respect to those of the coils in the open mode.

9. The method as claimed in claim 8, further comprising:
- (H) by the processor based on the metallic indication information and the living indication information, determining whether a metallic foreign object, a living foreign object, or both a metallic foreign object and a living foreign object have been detected;
- (I) by the processor based on the metallic indication information and the living indication information, determining whether to generate a warning signal; and
- (J) by the processor, resetting the metallic indication information, the living indication information, the loop counter and the detection procedure indicator, and setting the predetermined configuration pattern to be complied by arrangement of those of the coils in the closed mode with respect to those of the coils in the open mode.

10. A foreign object detection (FOD) device adapted to be utilized by a wireless power transfer system, the FOD device comprising:
- a processor;
- a detecting circuit assembly electrically connected to said processor;
- a coil electrically connected to said detecting circuit assembly and controllable to switch between a closed mode, where said coil and said detecting circuit assembly form a closed circuit, and an open mode, where said coil and said detecting circuit assembly form an open circuit;
- a signal generator electrically connected to said processor and said detecting circuit assembly;
- a coil configuring circuit electrically connected to said processor and said coil, and configured to control said coil to switch to one of the closed mode and the open mode the detecting circuit assembly further comprising a metallic FOD circuit configured to cooperate with said coil that is in the closed mode to detect a metallic foreign object and a living object protection (LOP) circuit configured to cooperate with said coil that is in the open mode to detect the living foreign object; and
- wherein said processor is configured to
  - output a control signal to said coil configuring circuit so as to control said coil configuring circuit to generate a switch signal for enabling said coil to switch to one of the closed mode and the open mode, and
  - control said signal generator to transmit a test signal to said coil via said detecting circuit assembly when said coil is in the open mode.

11. The FOD device as claimed in claim 10, wherein said coil is structured as three coil elements that are serially connected and that are spaced apart from each other by an interval on an insulated baseboard.

12. The FOD device as claimed in claim 10, wherein:
- said detecting circuit assembly is plural in number;
- said coil is plural in number, each of said coils being electrically connected to a respective one of said detecting circuit assemblies;
- said coil configuring circuit is plural in number, each of said coil configuring circuits being electrically connected to said processor and a respective one of said coils, and being configured to output the switch signal based on the control signal received from said processor to enable the respective one of said coils to switch to one of the closed mode and the open mode, such that arrangement of those of said coils in the closed mode with respect to those of said coils in the open mode complies with a predetermined configuration pattern; and
- said signal generator is plural in number, each of said signal generators being electrically connected to said processor and a respective one of said detecting circuit assemblies, and being configured to be controlled by said processor to transmit the test signal to the respective one of said coils when the respective one of said coils is in the open mode.

13. The FOD device as claimed in claim 12, wherein each of said detecting circuit assemblies includes:
- a metallic FOD circuit configured to cooperate with a respective one of said coils that is controlled to switch to the closed mode to detect a metallic foreign object; and a living object protection (LOP) circuit configured to cooperate with a respective one of said coils that is controlled to switch to the open mode to detect a living foreign object.

14. The FOD device as claimed in claim 12, wherein formation of the predetermined configuration pattern is programmable.

15. The FOD device as claimed in claim 12, wherein each of said coils is structured as three coil elements that are serially connected and that are spaced apart from each other by an interval on an insulated baseboard.

* * * * *